(12) United States Patent
Moebius et al.

(10) Patent No.: US 10,838,150 B2
(45) Date of Patent: Nov. 17, 2020

(54) COUPLING LENS ABERRATION CORRECTION THROUGH GRATING DESIGN IN A SWITCHED FOCAL PLANE ARRAY

(71) Applicant: The Charles Stark Draper Laboratory, Inc., Cambridge, MA (US)

(72) Inventors: Michael G. Moebius, Somerville, MA (US); Steven J. Byrnes, Watertown, MA (US); Steven J. Spector, Lexington, MA (US); Francis J. Rogomentich, Wilmington, MA (US); Matthew A. Sinclair, Stoneham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 167 days.

(21) Appl. No.: 16/202,254

(22) Filed: Nov. 28, 2018

(65) Prior Publication Data
US 2019/0162908 A1   May 30, 2019

Related U.S. Application Data

(60) Provisional application No. 62/688,073, filed on Jun. 21, 2018, provisional application No. 62/591,242, filed on Nov. 28, 2017.

(51) Int. Cl.
*G02B 6/34* (2006.01)
*G02B 27/00* (2006.01)
*G02B 6/124* (2006.01)
*G02B 6/12* (2006.01)

(52) U.S. Cl.
CPC .............. *G02B 6/34* (2013.01); *G02B 6/124* (2013.01); *G02B 27/0037* (2013.01); *G02B 2006/12107* (2013.01); *G02B 2006/12147* (2013.01)

(58) Field of Classification Search
None
See application file for complete search history.

(56) References Cited

U.S. PATENT DOCUMENTS

| 5,082,342 A | 1/1992 | Wight et al. |
| 2003/0011888 A1 | 1/2003 | Cox et al. |
| 2007/0053635 A1 | 3/2007 | Iazikov et al. |

(Continued)

FOREIGN PATENT DOCUMENTS

EP   2 626 731 A1   8/2013

OTHER PUBLICATIONS

European Patent Office, International Search Report and the Written Opinion of the International Searching Authority, Application No. PCT/US2018/062725, dated Mar. 4, 2019, 16 pages.

*Primary Examiner* — Chad H Smith
(74) *Attorney, Agent, or Firm* — Sunstein LLP

(57) ABSTRACT

A coupling interface arrangement is described for a photonic integrated circuit (PIC) device. The PIC includes an interface coupling surface having optical grating elements arranged to form optical output locations that produce corresponding light output beams. A coupling lens couples the light output beams into a conjugate plane at a far-field scene characterized by one or more optical aberrations that degrade optical resolution of the light outputs. The optical grating elements are configured to correct for the one or more optical aberrations.

32 Claims, 18 Drawing Sheets

(56) References Cited

U.S. PATENT DOCUMENTS

| | | |
|---|---|---|
| 2008/0031570 A1 | 2/2008 | Fondeur et al. |
| 2014/0376001 A1* | 12/2014 | Swanson ............ G01B 9/02004 356/479 |
| 2017/0242191 A1 | 8/2017 | Rhee et al. |
| 2018/0172918 A1 | 6/2018 | Lane et al. |
| 2018/0175961 A1 | 6/2018 | Spector et al. |

* cited by examiner

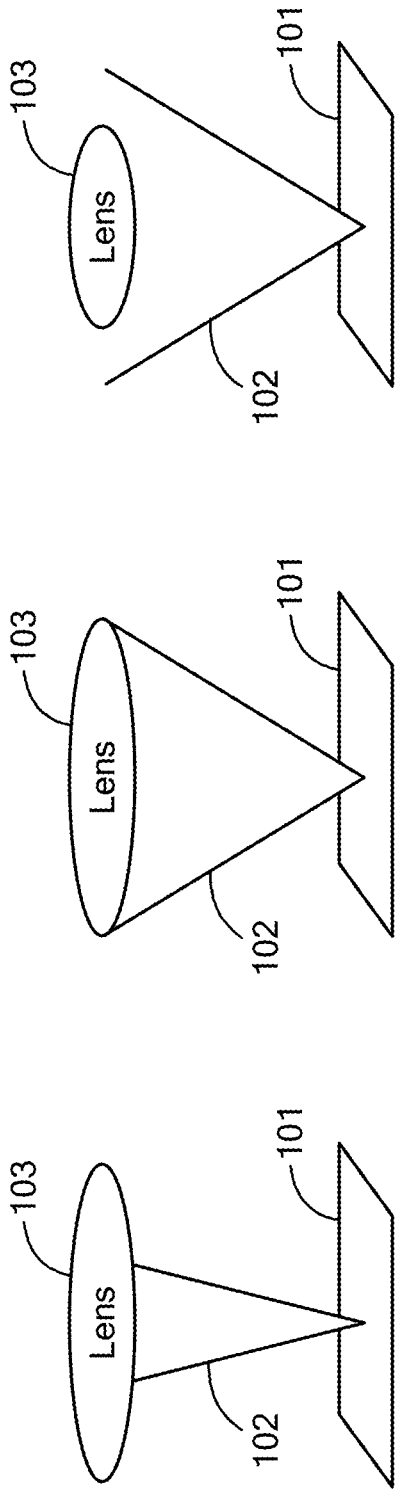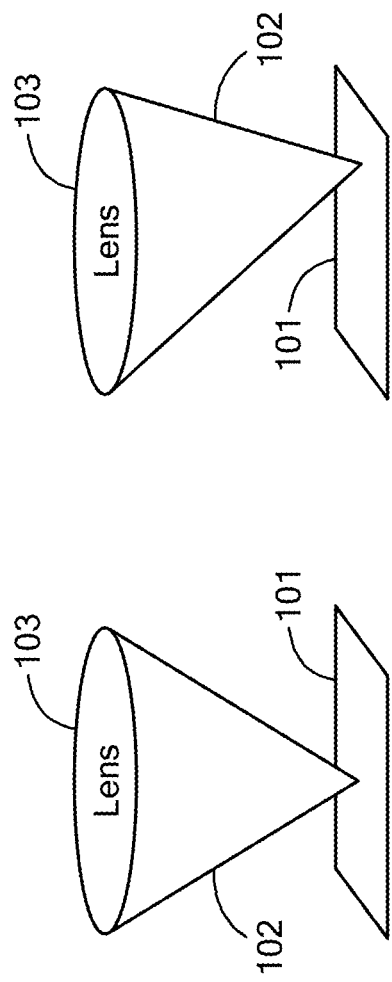

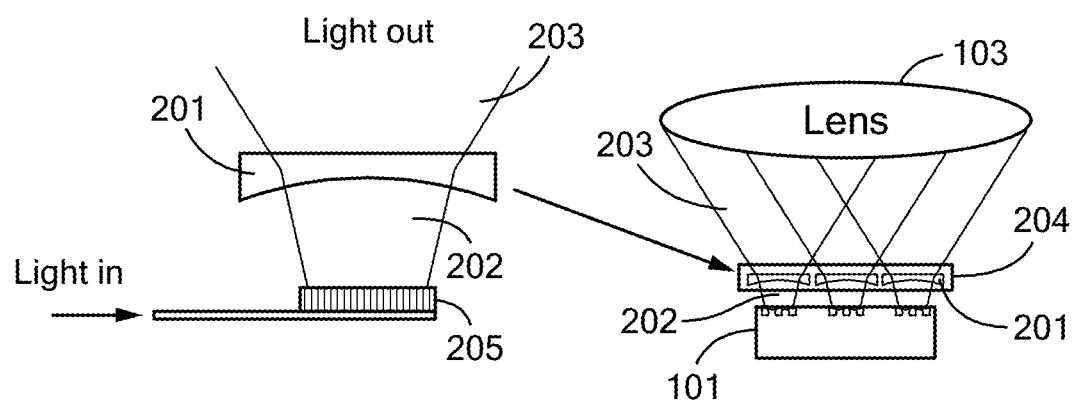
FIG. 2A FIG. 2B
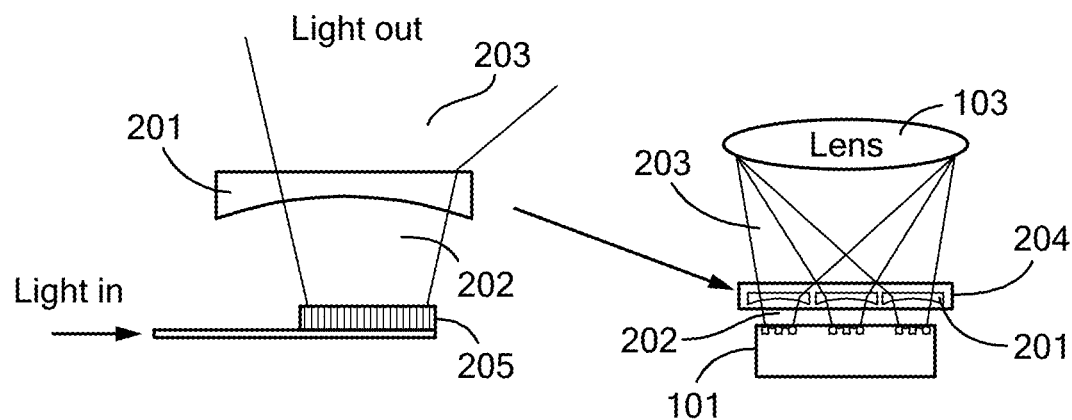
FIG. 2C FIG. 2D

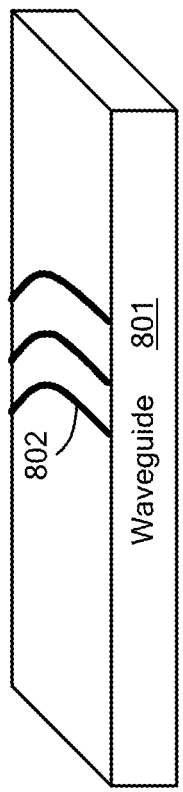
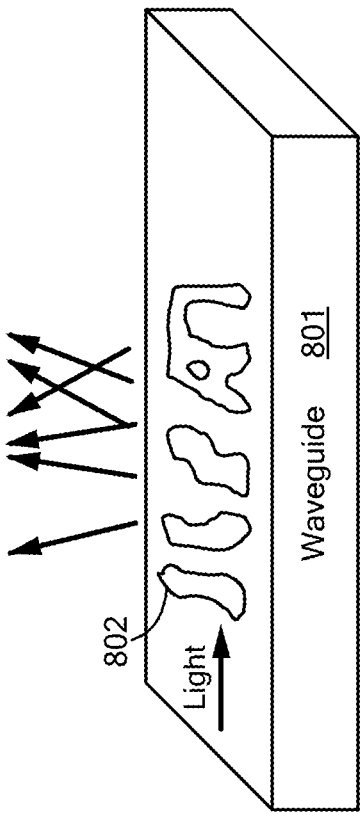
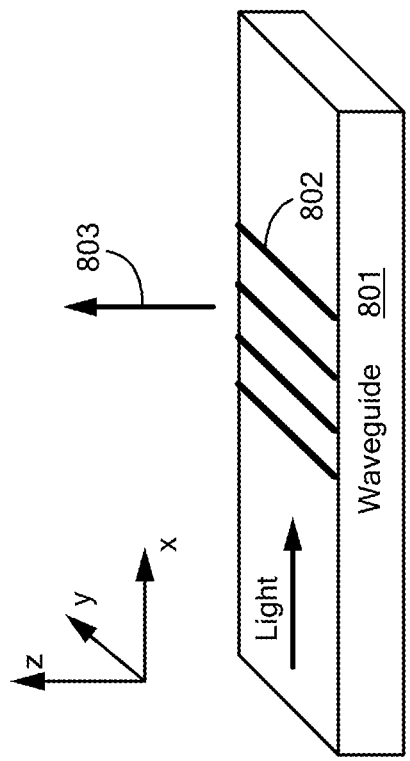
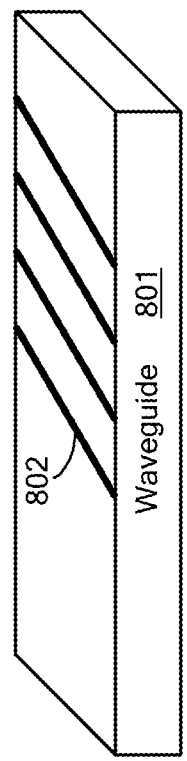
FIG. 8A
FIG. 8B
FIG. 8C
FIG. 8D a.) Perfect lens
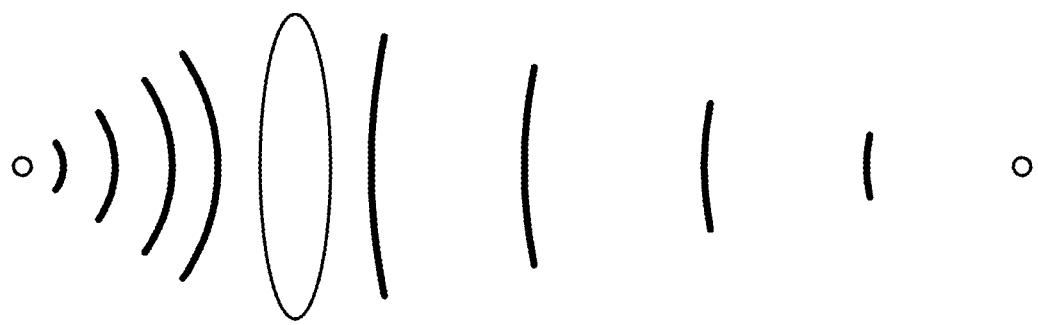
b.) Lens with aberrations
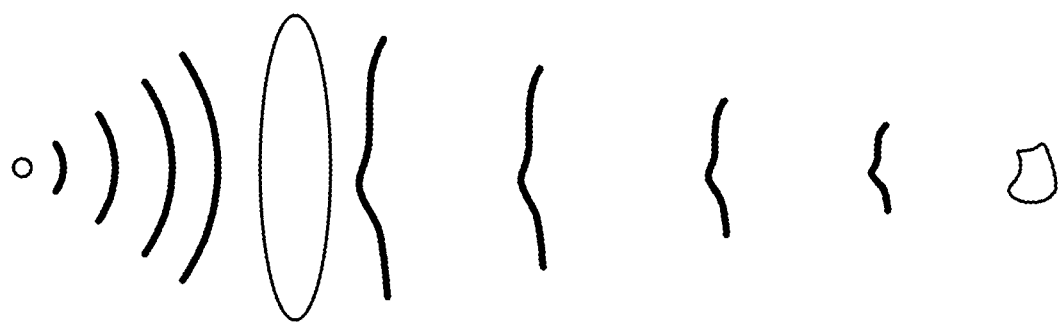
c.) Correction with grating
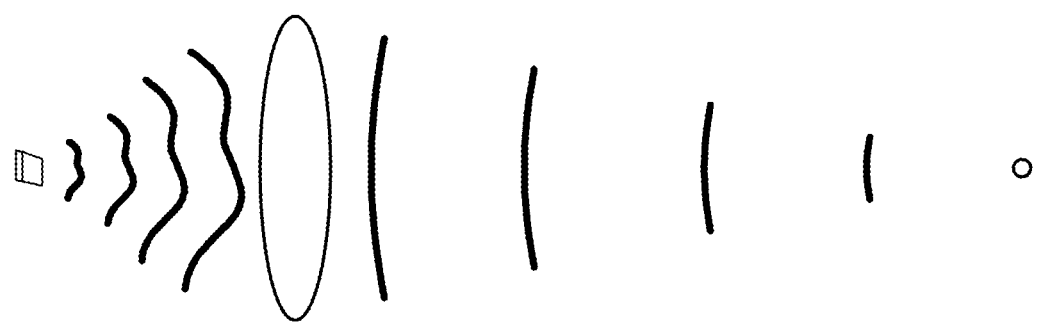
*FIG. 11*

Schematic of aberrations across the field of view of a system

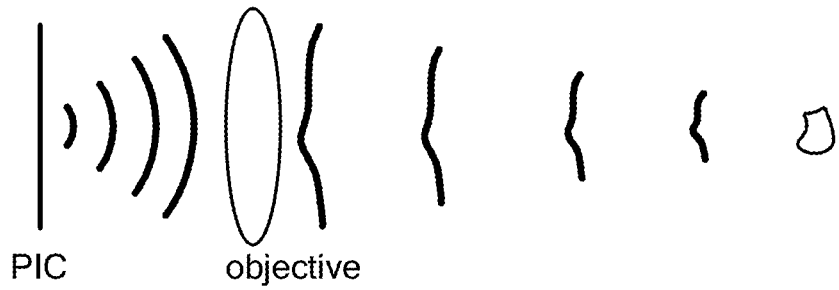
a.) Lens with aberrations
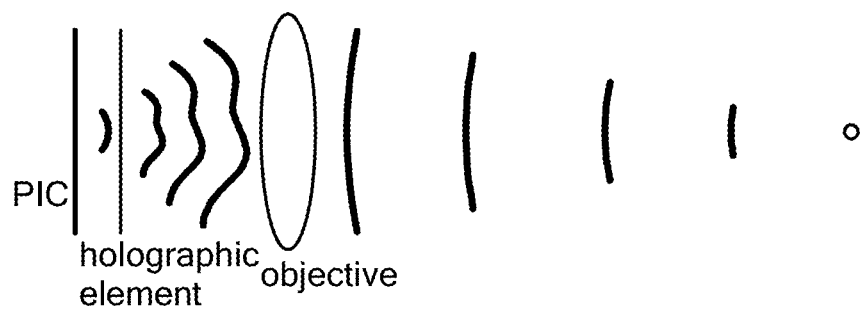
b.) Correction solely with holographic element
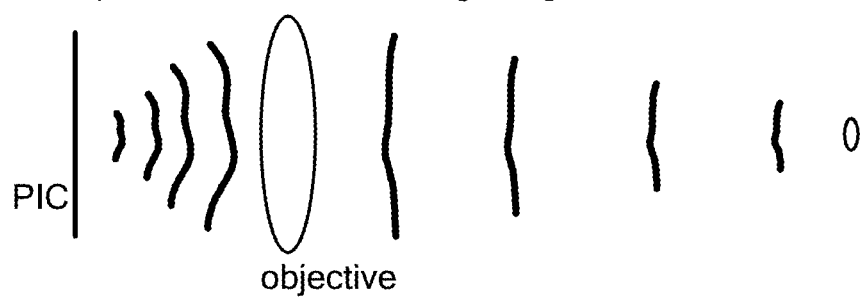
c.) Partial correction with grating
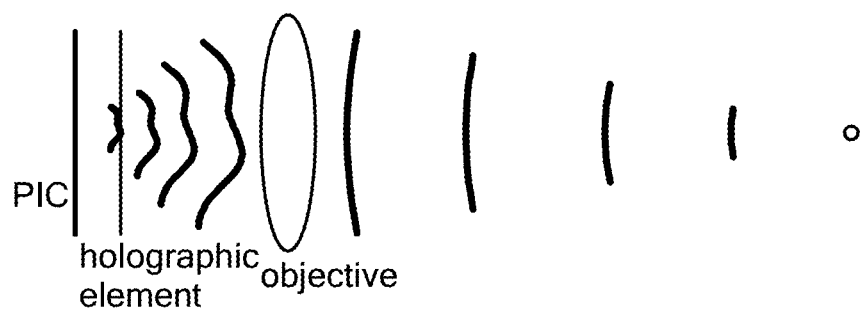
d.) Combined grating + holographic element
*FIG. 18*

COUPLING LENS ABERRATION CORRECTION THROUGH GRATING DESIGN IN A SWITCHED FOCAL PLANE ARRAY

This application claims priority from U.S. Provisional Patent Application 62/688,073, filed Jun. 21, 2018, and from U.S. Provisional Patent Application 62/591,242, filed Nov. 28, 2017, both of which are incorporated herein by reference in their entireties.

TECHNICAL FIELD

The present invention relates to optical coupling arrangements for photonic integrated circuit (PIC) devices.

BACKGROUND ART

In several areas, including LiDAR and free-space optical communication, it is advantageous to use a photonic integrated circuit (PIC) in which a steerable outgoing light beam can be sent out of the PIC (in the transmit case), or light beams from many possible directions can be collected into the PIC (in the receive case), or both. While the transmit and receive case seem superficially different, the designs frequently overlap due to the principle of electromagnetic reciprocity. One way to accomplish this goal is described in, for example, U.S. Patent Publication 20180175961 and U.S. Patent Publication 20180172918, both of which are incorporated herein by reference in their entireties. This approach involves many optical grating couplers which are spread out within the PIC, and a coupling lens (which might be either a single element or a lens train). This creates a "scene conjugate plane", i.e. a plane conjugate to the PIC plane with respect to the lens, which functions as the image plane into which the light is (ideally) focused into a spot in the transmit case, or which functions as the object plane from which point sources of light are focused onto the PIC in the receive case. In many cases, the scene conjugate plane is set at infinity, in which case the system is designed to create or collect collimated beams of light.

As shown in FIGS. 1A-1C, one challenge for such applications is that for best performance, the light outputs 102 leaving the interface coupling surface 101 should match the numerical lens aperture to just fill the coupling lens 103, enabling a diffraction limited spot at the scene conjugate plane with no wasted light. This is the case as shown in FIG. 1B, whereas in FIG. 1A, the divergence of the light output 102 is too small for the lens 103, and in FIG. 1C, the divergence of the light output 102 is too great for the coupling lens 103. Similarly, when the PIC device is operated as an optical receiver, all of the light from the coupling lens 103 should be coupled as light inputs to the interface coupling surface of the PIC, and again the device of FIG. 1B turns out to be preferable to FIG. 1A or FIG. 1C.

However, such operation can be difficult to obtain. For example, the grating design must be optimized to give the necessary divergence of the light outputs. In addition, depending on the position of the light output on the interface coupling surface, the relative position of the center of the lens is different. As shown in FIG. 1D, a light output 102 from the center of the interface coupling surface 101 is centered as to the coupling lens 103, whereas a light output 102 towards the edge of the interface coupling surface 101, as shown in FIG. 1E, needs to be angled to be centered on the coupling lens 103. In addition, output gratings do not perform well directly perpendicular to the surface of the PIC. The conditions for perpendicular optical coupling also produce a strong reflection back into the PIC. For best coupling performance, the light output should be at an angle off of normal. Another option is to design the grating in such a way as to minimize this back reflection—this is possible by engineering in destructive interference for the unwanted back reflection.

These issues typically are addressed by modifying the grating design of the interface coupling surface to improve the divergence performance. In some cases, this will require optimizing, for example, a large number of light emission directions from the PIC. This can be somewhat effective, but requires a large up-front investment in PIC design and can lead to complicated grating designs. So long as the same fabrication techniques can be utilized for the more complicated grating design (i.e. minimum feature sizes are within an achievable range), fabrication costs will be comparable to those for simpler grating designs. If different fabrication techniques are required for small features sizes, complicated grating designs can lead to more complicated fabrication processes. Other methods besides optical gratings can be used to couple light outputs out of the PIC, such as integrated mirrors. But these also can be challenging to fabricate and also may not have the desired divergence.

It also should be noted that grating design in optical processing applications often is concerned with a very different problem from light divergence, that of fiber coupling. When coupling to a fiber, the fiber needs to be in close proximity to the optical grating so it is very difficult to put an intermediate optic between the fiber and grating.

Lens arrays are commonly used for similar but different applications such as coupling to an optical grating from free space. In that case, the input light is assumed to be parallel, and there is no lens aperture that needs to be matched. Lens arrays also are used to couple to a standard focal plane array, in which case the lens array is used to improve the fill factor of a sparse detector array. When a lens array is used to improve the fill factor of coupling, the divergence of light from the grating needs to be matched to the aperture and f/# of the lenses in the lens array for optimal coupling. This can be done effectively for relatively large f/# s (3 or larger), but becomes challenging for smaller f/# s.

SUMMARY

Embodiments of the present invention are directed to coupling interface arrangements for transmitting light beams from a photonic integrated circuit (PIC) device to free space, and/or receiving light from free space into a PIC. In the receiver case, a coupling lens directs light from the scene conjugate plane (possibly infinity) onto the PIC's interface coupling surface, where it reaches optical grating elements arranged to direct this light into the PIC. The coupling lens is characterized by one or more optical aberrations such that a point source in the scene conjugate plane is focused into a blurry spot on the PIC, a fact which would normally decrease the efficiency with which this light can be directed into the PIC. However, the optical grating elements are configured to correct for the one or more optical aberrations, coupling light efficiently from the blurry spot into the PIC. In the transmitter case, which is fundamentally related by the principle of electromagnetic reciprocity, the coupling lens's optical aberrations mean that a point source of light at the PIC's interface coupling surface would create a blurry spot in the scene conjugate plane (possibly infinity). However, the optical grating element does not in fact emit a point source, but rather a particular wavefront designed to correct for the one or more aberrations to form a sharper spot in the scene conjugate plane.

In further specific embodiments, the optical grating elements are characterized by a grating tooth width and grating period, if the grating is periodic, or more generally a grating geometry if the grating is not periodic, as well as a grating thickness, at least one of which is configured to correct for the aberrations of the coupling lens. The PIC may include optical waveguides that are configured to deliver light to or collect light from the optical output locations and that are characterized by a waveguide geometry (thickness and cross-sectional profile) configured to correct for the aberrations of the coupling lens. The PIC also may be characterized by a grating-waveguide spacing configured to correct for the aberrations of the coupling lens. One such aberration is field curvature, in which case, the optical grating elements may be configured to collect or emit light beams whose focal point is some distance above or below the actual element.

The optical grating elements may be organized in a periodic arrangement or an aperiodic arrangement. The PIC may be configured as a monostatic optical element or a bistatic optical element. The coupling lens may be a telecentric lens for coupling light output beams with chief ray optic axes perpendicular to the interface coupling surface, or a conventional lens for coupling light output beams with chief ray optic axes at various different angles relative to perpendicular to the interface coupling surface.

In specific embodiments, there also may be a planar lens array with multiple lens elements of differing focal lengths located between the interface coupling surface and the coupling lens and configured to match the focal planes of the PIC and coupling lens. The PIC may be characterized by a field-of-view, and the optical grating elements and the planar lens array may be organized to shift the focal plane of pixels at different points within the field of view and/or the optical grating elements may be organized into a plurality of grating subsets each optimized for a different range in the field of view. In addition or alternatively, there may be a holographic element located between the interface coupling surface and the coupling lens configured to cooperate with the optical grating elements to adjust the phase and intensity profiles of the light output beams to correct for the one or more optical aberrations. And the optical grating elements may be configured to match a numerical aperture of the PIC light beams with a numerical aperture of the coupling lens.

Embodiments of the present invention also include a LiDAR system or a free-space optical communications system having a coupling interface arrangement according to any of the foregoing.

BRIEF DESCRIPTION OF THE DRAWINGS

FIGS. 1A-1E illustrate issues of light divergence as to PIC devices and associated coupling lenses.

FIGS. 2A-2D show light divergence as used in coupling arrays according to embodiments of the present invention.

FIGS. 8A-8D show how grating design (e.g. angle and shape) can be used to shift the emission direction and focus of the light output beams.

FIG. 11 schematically shows how beam forming is impacted by aberrations and how grating design can be used to correct for those aberrations.

FIG. 18 shows how a holographic element can be used the PIC and the coupling lens.

DETAILED DESCRIPTION

Figure 3:
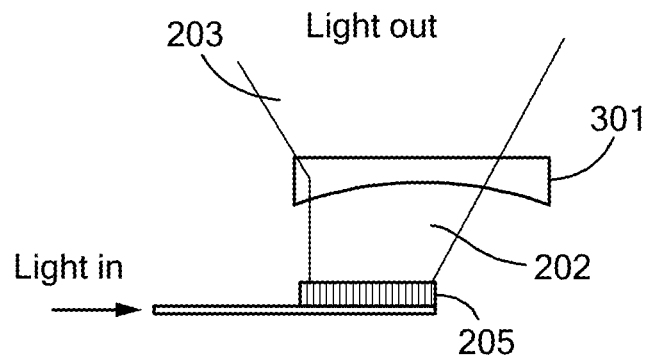
FIG. 3 shows how planar movement of a light shaping element can control the position of a given light beam.

The signal collected by optical terminals increases with the area of the steering/collection lens. Using lower f/# lenses (higher numerical aperture) enables collecting more light while minimizing device volume. However, a low f/# lens also leads to large divergence of light and very small spot size on the PIC, which makes design of efficient gratings difficult or impossible, depending on the desired coupling efficiency. Using an intermediary lens array can enable coupling a larger beam spot with smaller divergence into a grating from a low f/# steering/collection lens.

To improve coupling and divergence characteristics for coupling light into and out of a PIC, a coupling array of multiple light shaping elements can be placed near the light outputs of the device. The following discussion is presented in terms of arrangements for coupling light outputs from a PIC, but it should be understood that the invention also is useful going the other way to couple light inputs into a PIC. Also, the discussion is presented speaking of the interface coupling surface being an optical grating, but again the invention is not limited to such specific structures and the interface coupling surface could usefully be some other specific form of structure such as an arrangement of integrated mirrors.

FIG. 2A shows how the divergence of the light output 202 from a single output grating 205 can be modified using a concave lens as a light shaping element 201 to shape and direct the light beam 203. The negative powered shape provided by the concave surface of the light shaping element 201 arranged to be facing towards the output gratings 205 in the interface coupling surface 101 increases the divergence of the light beam 204. FIG. 2B shows how a coupling array 204 of multiple such light shaping elements 201 then would function to shape and direct the light outputs 202 from the interface coupling surface 101 to the coupling lens 103 so that each light beam 203 matches the lens aperture of the lens 103 to just fill the aperture.

FIGS. 2C and 2D show how it is possible to move the position of the light shaping element 201 to simultaneously modify the divergence and tilt the direction of the light beam 203 to promote proper filling and matching of the lens aperture from angular different positions of the output gratings 205 and their corresponding light outputs 202. Thus, in specific embodiments, it may be useful for the position of a given light shaping element 201 to be offset in a plane over the interface coupling surface 101 of the PIC with respect to a given output grating 205 and corresponding light output 202.

In addition, FIG. 3 shows how the light shaping element 301 can be offset from the position of the output grating 205 so as to redirect a light output 202 that is emitted in a non-normal direction. That ability can be very useful since as previously discussed, it is difficult for an output grating 205 to emit a light output 202 at a perpendicular angle.

It will be appreciated that a similar arrangement can be implemented for delivering light inputs to a photonic integrated circuit (PIC) device where the interface coupling surface 101 is an optical grating with multiple optical input locations 205 each configured to receive a light input to the PIC. The coupling lens 103 has a lens aperture through which pass light beams from an optical processing system for shaping of the light beams by the coupling lens 103 for delivery to the PIC. The optical coupling array 204 is located between the interface coupling surface 101 of the PIC and the coupling lens 103 and there are multiple individual light shaping elements 201 that are configured for transmission and shaping of the light beams from the coupling lens 103 for delivery of entire light beams to selected optical input locations 205 of the PIC.

Figure 4A:
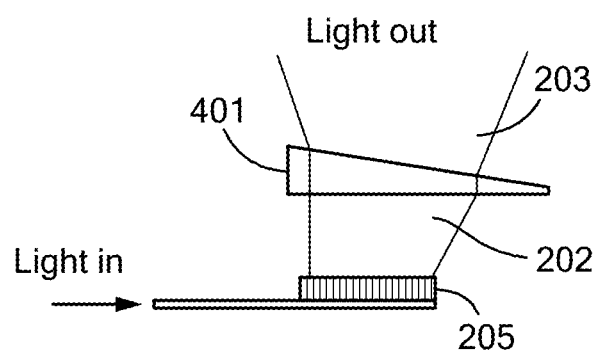
FIGS. 4A-4B show prismatic light shaping elements can affect light divergence in embodiments of the present invention.
Figure 4B:
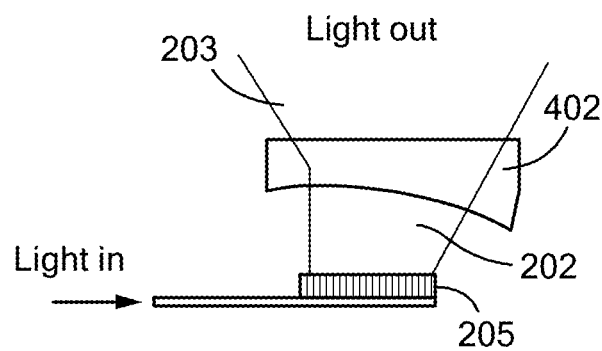

FIG. 4A shows that one or more of the light shaping elements 401 may specifically be shaped to act as a prism to refract the light output 203 to modify its tilt to direct it toward the coupling lens. One distinction between a prism and a lens for use as a light shaping element in the coupling array is that the change in direction of a light beam caused by a lens can be varied by altering the position of the lens, without changing the lens design. But the angle of a prism and its resulting direction change is fixed unless the prism is modified. Still, larger angles of tilt/direction change can be obtained with a prism-shaped light shaping element 401 than from an offset lens. Therefore, a prism shape can be more useful for obtaining large tilt angles/larger direction changes, while using offset lens shape can be better when the tilt/direction change needs to be varied. Alternatively a large prism can be placed between the coupling lens and the interface coupling surface. In addition, as shown in FIG. 4B, the light shaping element 402 may specifically be a hybrid prismatic lens element configured to direct and shape the light beam 203 so that it matches the lens aperture of the lens 103 to just fill the aperture.

Typically, the light shaping elements are made from silica glass, but it is also possible to use other materials, such as polymers. Depending on the numerical aperture and pitch needed for the light shaping elements, some fabrication techniques may not be usable to produce purely refractive coupling arrays. For example, very large curvature for low f/# s (high numerical aperture) may not be producible. In those circumstances, diffractive Fresnel/kinoform lenses can be used as light shaping elements.

The foregoing describes using a lens array and/or prism between the optical grating elements and the coupling lens. But that approach does require alignment of an additional optical element in the system. Additional optical elements also add complexity and cost to the system.

Another way to accomplish aperture matching in photonic integrated circuits (PIC) is with intelligent design of the optical grating interface, which can be fabricated across the area of a PIC with standard microfabrication techniques. Once the up-front design work is done, the fabrication costs are low. Optical gratings can be designed with different emission angles from the chip and different numerical apertures. These variations are necessary, depending on coupling lens design. Varying both emission angle and numerical aperture enables filling a larger area on the coupling lens system, can reduce vignetting of outgoing and return light, and can help reduce optical aberrations.

Figure 5A:
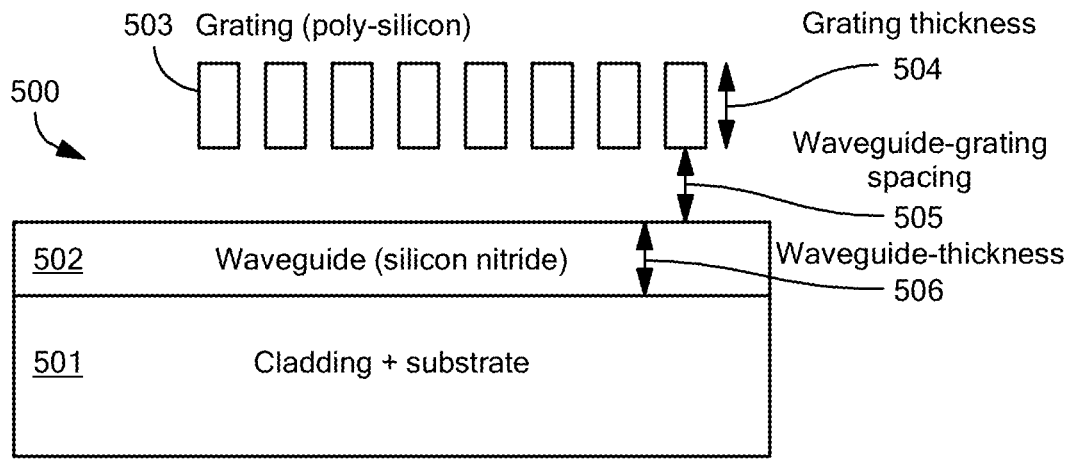
FIGS. 5A-5C show how a variety of grating parameters may be optimized to design for a desired emission angle and numerical aperture for aperture matching.
Figure 5B:
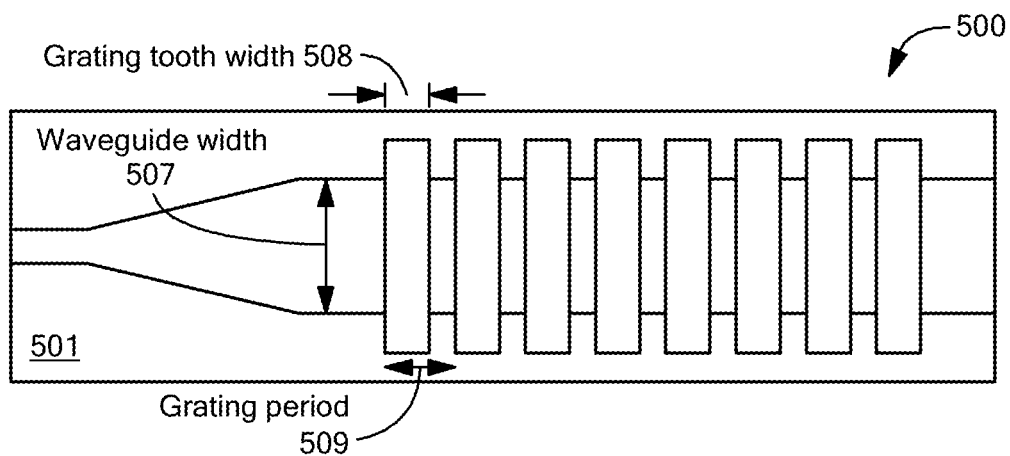
Figure 5C:
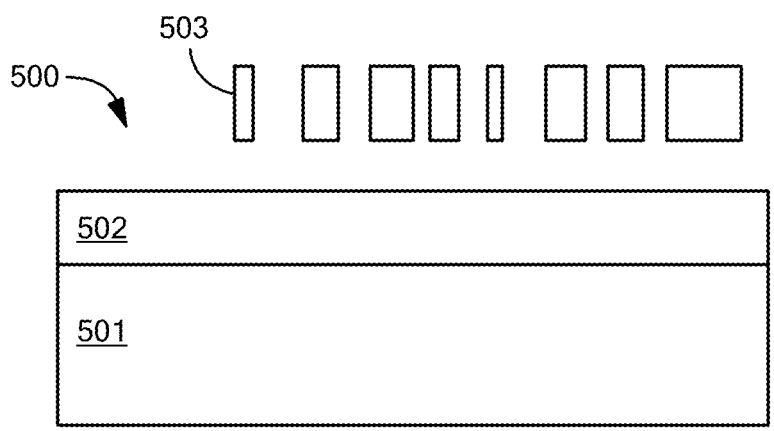

A variety of grating parameters may be optimized to design for a desired emission angle and numerical aperture for aperture matching as depicted in FIGS. 5A-5C. A PIC 500 has a given cladding and substrate 501 and multiple waveguides 502 that are configured to deliver light to optical output gratings 503 on an outward facing interface coupling surface of the PIC 500. Various dimensions such as grating thickness 504, spacing between waveguide and grating 505, and waveguide thickness 506 affect the coupling efficiency of the optical grating elements 503. Grating tooth width 508, grating period 509, and waveguide width 507 also play important roles in determining the emission angle of the optical grating elements 503. The structures shown in FIGS. 5A and 5B have periodic gratings, but other specific designs such as shown in FIG. 5C may use aperiodic gratings. Periodic gratings may have a more straight-forward design because there are fewer free parameters to optimize. But aperiodic gratings allow optimization of each individual grating tooth width and period, for more flexibility in tailoring the numerical aperture and emitted phase front of the grating.

FIG. 5A shows that the waveguide 502 is made of silicon nitride material and that the grating 503 is made of polysilicon material, but other materials may be suitably substituted. A wide variety of materials may be used to fabricate the waveguide 502 depending on the operating wavelength of the device. In general, the waveguide material should have a low optical loss and a refractive index higher than the surrounding cladding and substrate. The grating 503 can have a higher optical absorption at the operating wavelength because the propagation length through it is short. For example, for visible and near-infrared light wavelengths (700-1100 nm), the waveguide 502 could be fabricated from silicon nitride, diamond, titanium dioxide, lithium niobate, chalcogenide glasses, sapphire, silicon carbide, etc. The grating 503 can, for example, be any of those materials as well as, for example, poly-silicon, amorphous silicon, crystalline silicon, etc. For infrared applications (e.g. telecom wavelengths around 1300-1600 nm), the waveguide 502 could also be fabricated out of silicon-rich silicon nitride or silicon among other materials.

Figure 6A:
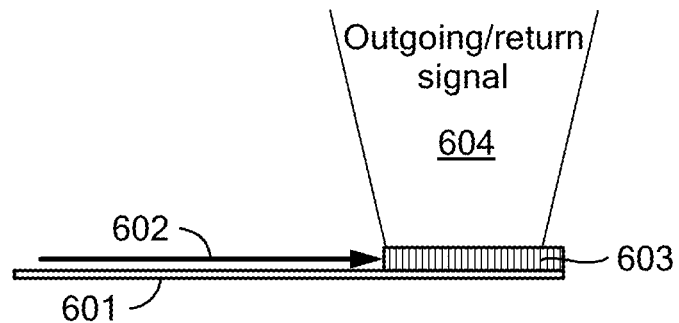
FIGS. 6A-6C illustrate the concepts of grating numerical aperture and emission angle.
Figure 6B:
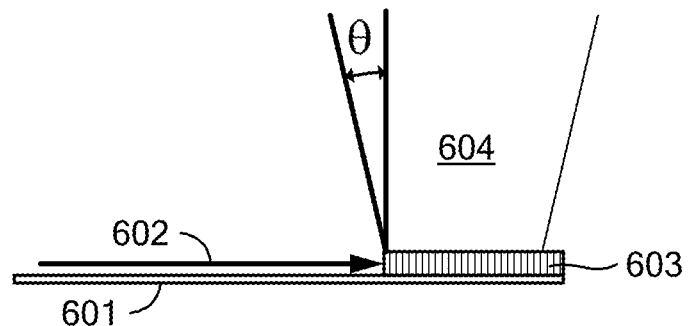
Figure 6C:
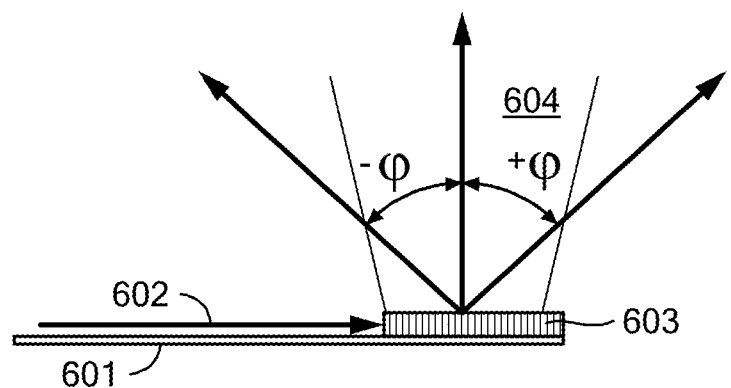
Figure 7A:
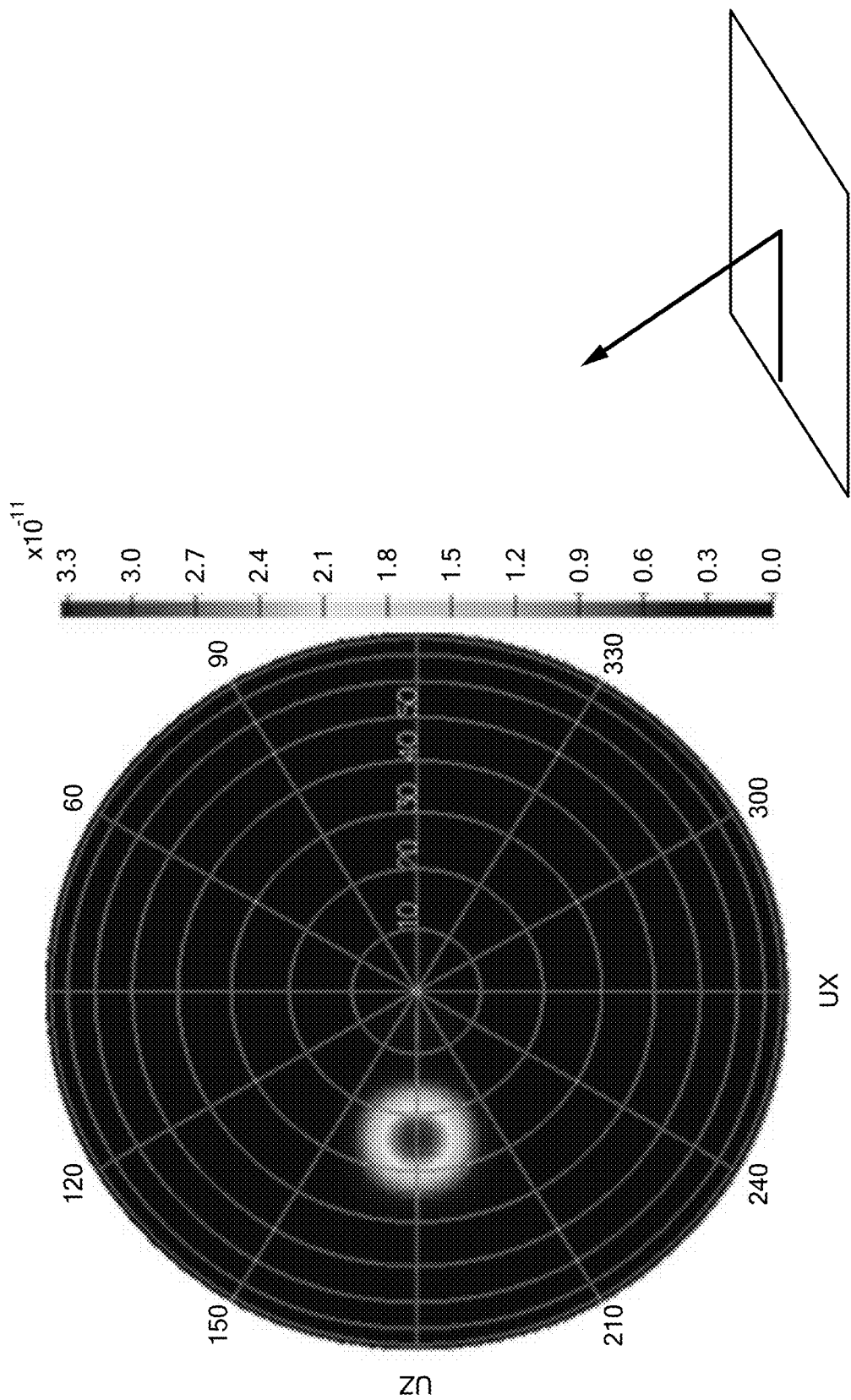
FIG. 7A-7B show graphs for two examples of far-field beam profiles.
Figure 7B:
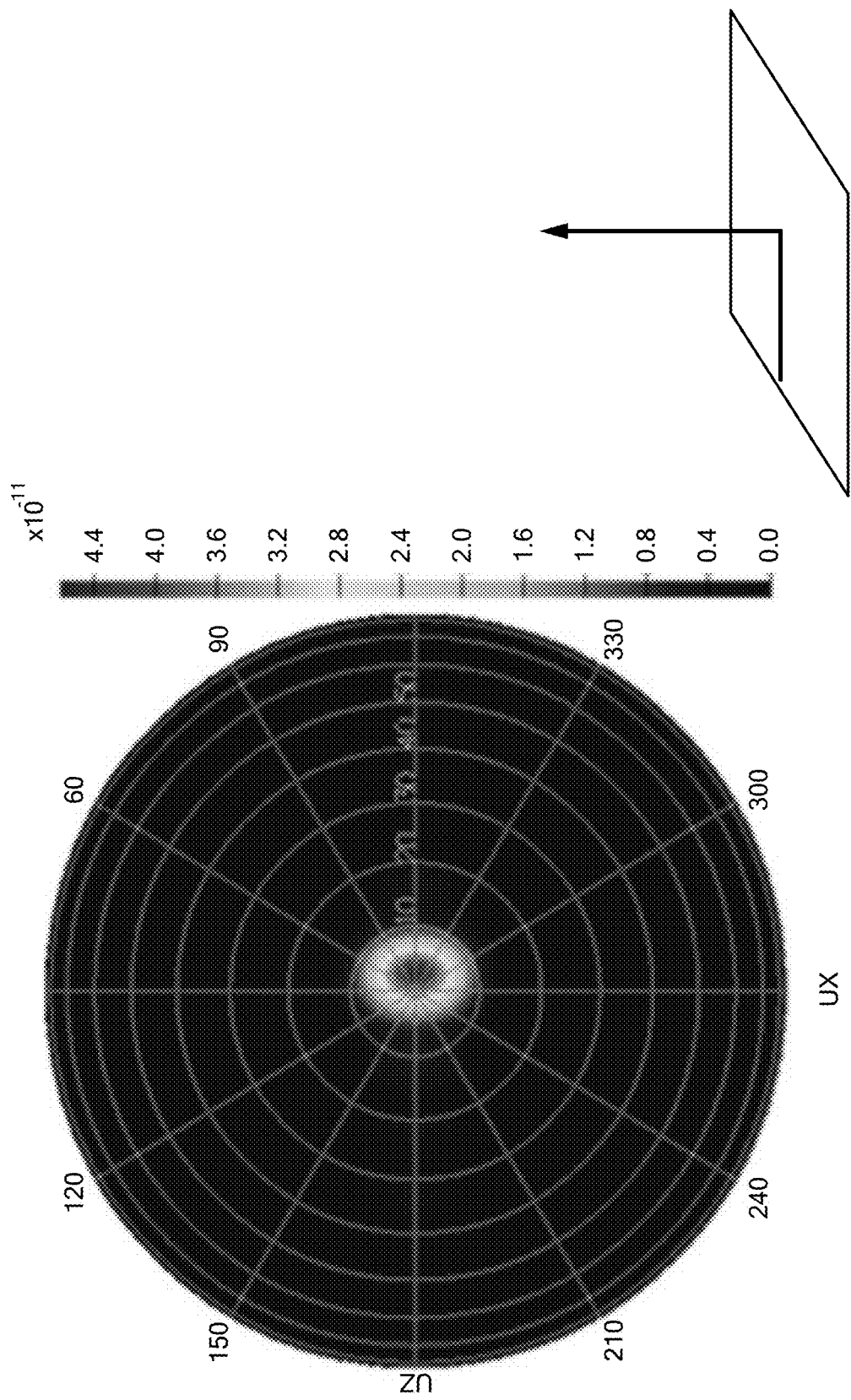

FIGS. 6A-6C illustrate the concepts of grating numerical aperture and emission angle. For waveguided light 602 traveling in a given waveguide 601, the optical grating 603 couples the outgoing optical beam 604 at a numerical aperture given by NA=n·sin(θ) (see FIG. 6B). Normal emission, FIG. 6C, is defined as light exiting the grating 601 normal to the PIC. Backward emission has an emission angle −φ relative to normal emission and forward emission has an emission angle +φ relative to normal emission. FIG. 7A-7B show graphs for two examples of far-field beam intensity profiles for light starting in the waveguide 601 and emitted by different aperiodic optical grating elements 603 showing how different grating designs can steer the output light beam to better match to the lens train. In particular, the grating in FIG. 7A might correspond to a grating located as in FIG. 1E, while the grating in FIG. 7B might correspond to a grating located as in FIG. 1D.

Grating design can also be used to shift the emission direction or focus in the transverse dimension, i.e. the dimension labeled "y" in FIG. 8, in the PIC plane but perpendicular to the waveguide. FIG. 8A shows an example of a waveguide 801 with typical grating teeth 802 parallel to the transverse (y)-direction so as to send output light into a cone centered on the x-z plane. Alternatively, as shown in FIG. 8B, the grating teeth 802 can be sheared in the x-y plane to impart a y-component to the output light beam. In FIG. 8C, the grating teeth are curved in order to shift the focal plane of the outgoing wavefronts in the z-direction. FIG. 8D shows schematically that computational design techniques such as topology optimization can be used to design grating arrangements which differ greatly in appearance from traditional gratings with linear or curved rulings. These gratings can be characterized as extreme examples of aperiodic gratings. Allowing more degrees of freedom in the grating design makes it possible to optimize more parameters in the emitted beam.

Systems that rely on collecting signal by coupling it into a waveguide are highly selective in terms of which optical modes will couple efficiently into the waveguide. As a result, a LiDAR system, for instance, that is in a monostatic configuration (the same PIC and lens system is used to both send and receive light) will have a higher return signal if the light emitted from the PIC can be focused into as small a spot as possible in the scene conjugate plane, and thus it is sensitive to aberrations introduced to the outgoing beam by the coupling lens.

Figure 9:
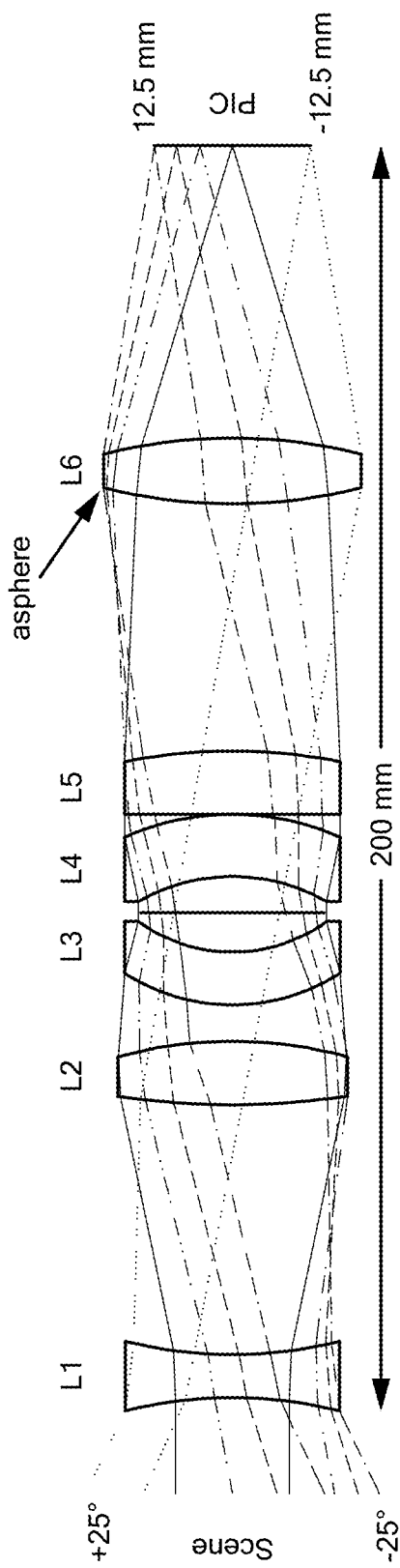
FIG. 9 shows an example of a six-element coupling lens system with aberration correction across a 50 degree field of view.
Figure 10A:
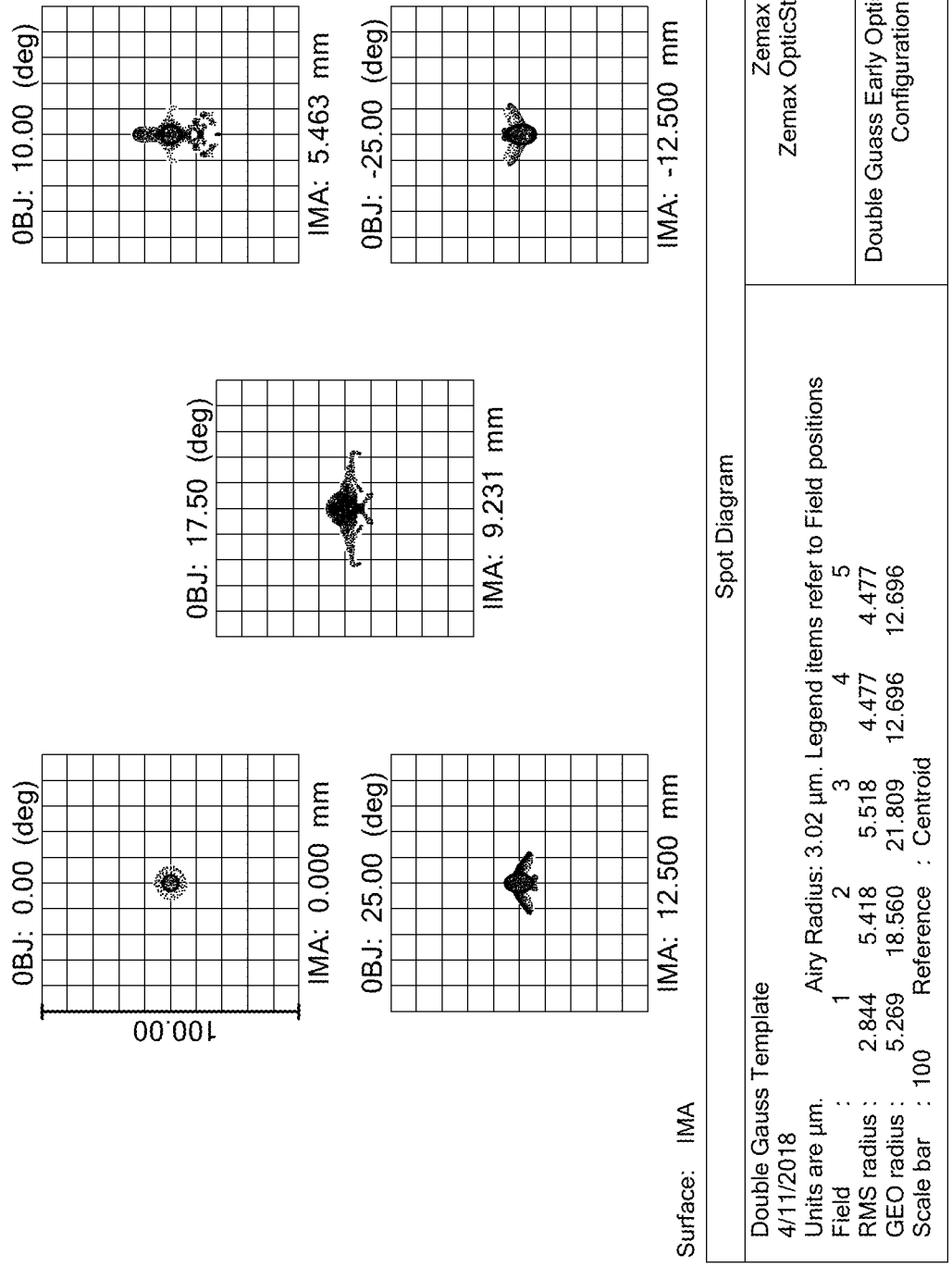
FIGS. 10A-10B show corresponding spot diagrams for the coupling lens train in FIG. 6 and for a variation thereof.
Figure 10B:
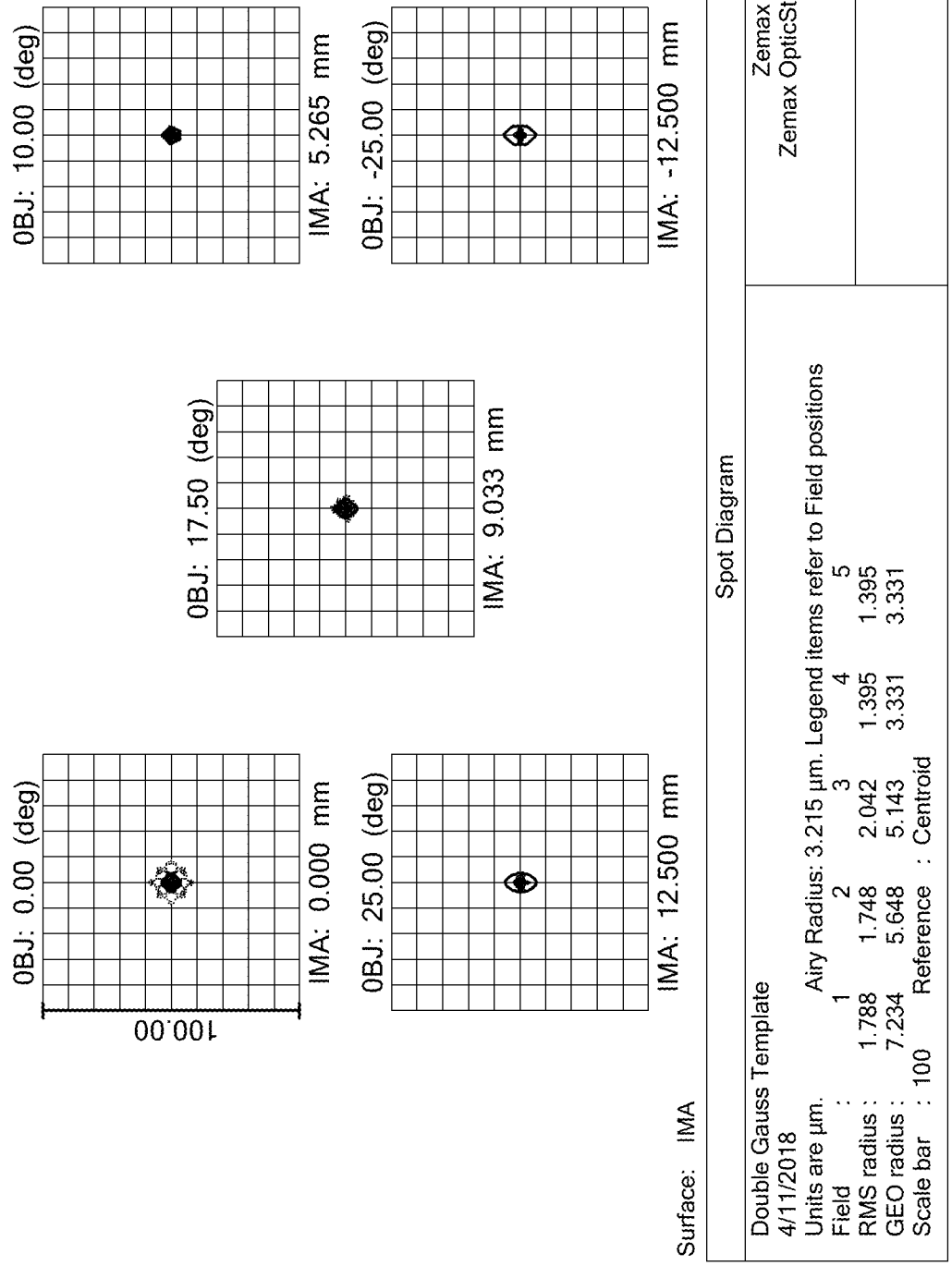

Combining a large aperture (small F/#), wide field of view, and high resolution is challenging and requires aberration correction to approach diffraction-limited performance. Coupling lens designs for such situations require many elements to correct for different kinds of aberrations. Additional elements make the coupling lens train large, heavy, and expensive. FIG. 9 shows an example of a six-element coupling lens system with aberration correction across a 50 degree field of view. FIG. 10A shows the corresponding spot diagram for this coupling lens train. Including a more specialized lens design (a sphere on L6) improves aberration correction as shown in FIG. 10B, but adds complexity to the design.

FIG. 11 schematically shows how beam forming is impacted by aberrations and how grating design can be used to correct for those aberrations. The wavefronts in part a) show that a perfect lens will image a point source in the PIC interface coupling plane into a diffraction-limited beam spot in the scene conjugate plane. The wavefront of part b) shows that optical aberrations introduced by a real coupling lens will lead to distortions in the wavefront and a distorted (larger, non-diffraction limited) spot in the scene conjugate plane. Then the wavefront in part c) shows how a properly designed optical grating can impart wavefront distortions to the outgoing beam in the PIC interface coupling plane to "precorrect" for the aberrations that the coupling lens will introduce. As a result, the beam spot in the scene conjugate plane will be smaller.

Thus in addition to aperture matching as described above, embodiments of the present invention also use grating design to correct for optical aberrations that are introduced to the outgoing beam by the coupling lens. Both lens train and grating design can be leveraged to correct for aberrations.

Embodiments of the present invention are directed to coupling interface arrangements for receiving light beams from a photonic integrated circuit (PIC) device that includes an interface coupling surface with optical grating elements arranged to form optical output locations that produce corresponding light output beams. A coupling lens couples the light output beams into a conjugate plane at the far-field scene characterized by one or more optical aberrations that degrade optical resolution of the light outputs. The optical grating elements are configured to correct for the one or more optical aberrations.

Figure 12:
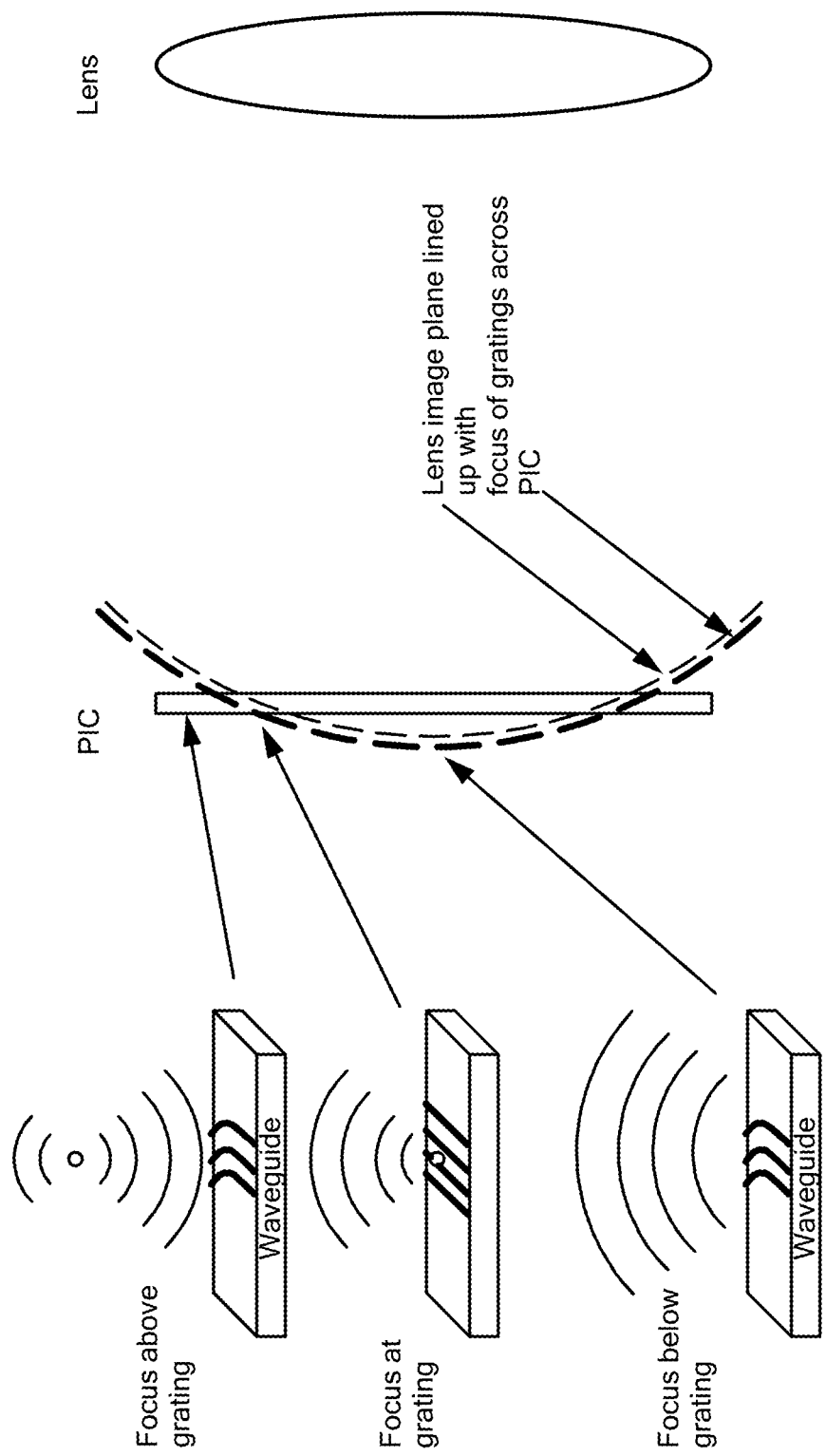
FIG. 12 shows how optical grating elements can shift the focus of the beam emitted from the grating above or below the plane of the device.

As discussed above with respect to aperture filling, a variety of specific grating parameters may be optimized to design for a desired emission pattern (see FIGS. 5A-5C). Grating thickness, spacing between waveguide and grating, and waveguide thickness play a large role in determining grating efficiency. Grating tooth width, grating period, and wavelength play an important role in determining emission angle of the grating. Angling the grating teeth relative to the waveguide can change the emission angle in the direction perpendicular to the plane formed by the waveguide and device normal (see FIGS. 8A-8D). The optical grating elements may be organized in a periodic arrangement or an aperiodic arrangement, and the PIC may be configured as a monostatic optical element or a bistatic optical element in a LiDAR system. As shown in FIG. 12, the optical grating elements can also shift the focus of the beam emitted from the grating above or below the plane of the device, allowing corrections for a curved focal plane.

Using the optical grating elements to correct for optical aberrations has a number of positive impacts on the system:

Correcting for optical aberrations via the optical grating elements keeps system cost down because after the up-front cost of grating design, PIC fabrication costs will be similar to a system using very simple grating designs. In contrast, complex objectives designed for aberration correction are often more expensive and larger (e.g. more elements, larger number of different materials).

Correcting for aberrations in transmission improves the gain (beam forming ability) of the system. This can result in better resolution by producing a tighter spot in the scene.

Reducing aberrations in the outgoing beam allows for more signal to be collected by the system on the return pass. In the case of a LiDAR system, for example, this can increase maximum range, scan rate, and success of ranging measurements.

Figure 13B:
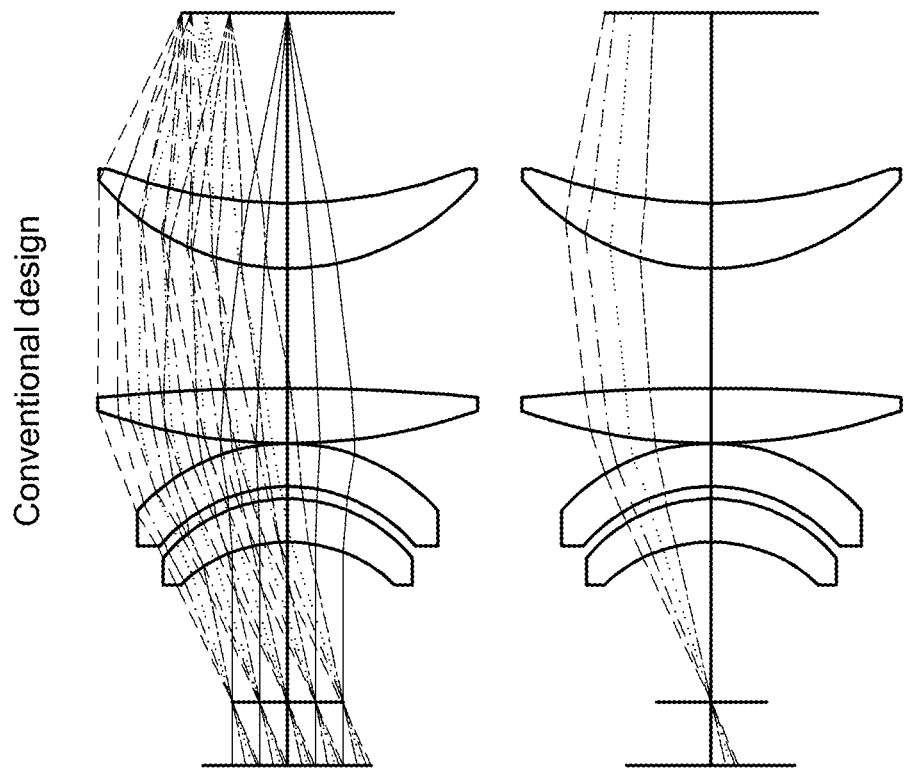
FIGS. 13A-13B show how coupling lenses can be designed with different expected emission patterns from the image plane.
Figure 13A:
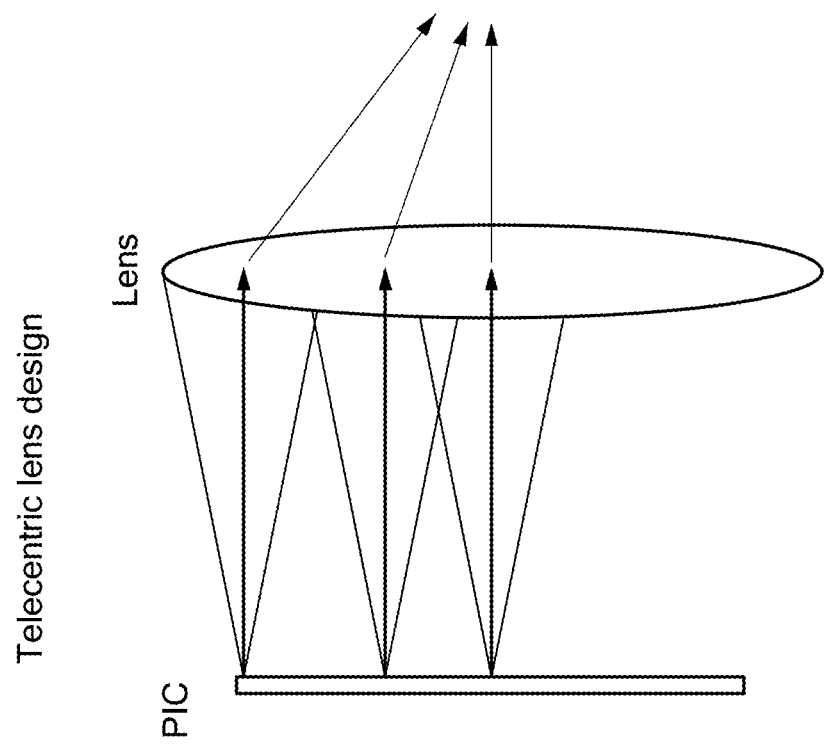

Coupling lenses can be designed with different expected emission patterns from the PIC. A telecentric objective is optimized to couple to beams that are emitted with the optical axis (chief rays) perpendicular to the focal plane array (parallel to the optic axis of the coupling lens) as shown in FIG. 13A. Conventional lens designs are configured such that the chief rays all pass through the center of the aperture stop, but the chief rays can be angled with respect to the optic axis of the coupling lens at the focal plane array, see FIG. 13B. The design of the optical grating elements can optimize the optical output locations on the interface coupling surface for both of these lens configurations, enabling aperture matching between a PIC at the focal plane and the objective across the full image plane.

Figure 14:
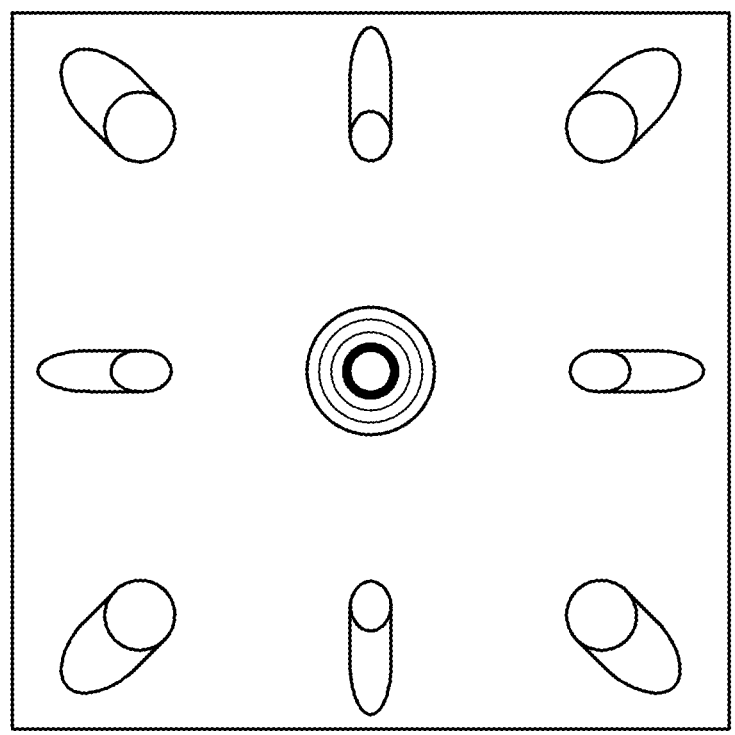
FIG. 14 shows how aberrations can vary across the field of view.

Systems can also be optimized to take into account distortion and differences in aberrations across the field of view. Distortion can have the effect of optical output locations which are arranged in a square pattern on the interface coupling surface producing an array of spots in the scene with a "pincushion" or "barrel" shape. In the case of a LiDAR system, for example, the optical grating elements can be designed with built-in corrective distortion to balance performance across the full field of view (e.g. by spacing the optical grating elements differently across the interface coupling surface to pre-correct for the distortion that will be introduced by the coupling lens). Alternatively, if the resolution of the system is sufficient, distortion can be addressed in image processing during image reconstruction. Aberrations will also vary across the field of view as shown in FIG. 14. If the optical grating elements are used to correct for aberrations, the grating design can be varied across the field of view to correct for different distortions at each point within the field of view. This may include optimizing every grating separately, or putting different gratings in different regions, or creating a series of gradually-changing gratings using interpolation between a number of optimized designs.

Figure 15:
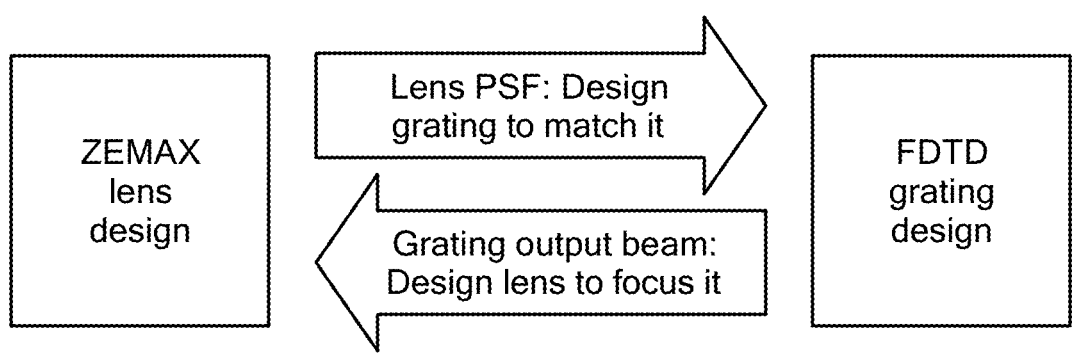
FIG. 15 illustrates how lenses can be designed with Zemax Optical Design Software and the grating couplers with FDTD software.

FIG. 15 illustrates how lenses can be designed with Zemax optical design software (Zemax, LLC) or other similar lens design software, and the grating couplers with FDTD (Finite Difference Time Domain) software, and how the two design processes will interrelate. Given a specific lens train, the grating design can be optimized as follows. If there were a point source of light in the scene conjugate plane, it would get focused to a little spot at the plane of the PIC. The optical-frequency electric field of this dot is referred to as the "amplitude PSF", a complex-valued function $E(x,y)$. The (ordinary) PSF describing the intensity profile of this dot is $|E^2(x,y)|$. The lens's amplitude PSF, calculated by physical optics (not just ray-tracing) in Zemax, is the input to the FDTD, wherein a grating design optimization algorithm takes light in the waveguide and manipulates it with the grating to try to create the complex conjugate field $E^*(x,y)$ in free space above the grating, as faithfully and efficiently as possible. The lens's amplitude PSF could also be measured experimentally, rather than predicted with Zemax.

In the other direction of FIG. 15, if a specific grating design is assumed, the FDTD software can predict what beam it will create. Then this beam (or an approximation thereof) can then be propagated through the lenses, apertures, and free space using physical optics analysis in Zemax. The lens can then be optimized to create the smallest possible spot size at the scene conjugate plane In LiDAR applications, spot size is specifically defined as:

$$\text{spot area} = \frac{\left[\int\int dx\, dy\, I(x, y)\right]^2}{\int\int dx\, dy\, I^2(x, y)}$$

where x,y are coordinates at the scene conjugate plane and I is light intensity. This specific definition is used rather than, say FWHM, because it turns out that round-trip photon collection efficiency is a straightforward function of spot area, if the latter is defined using the above expression.

For a given specific system to work optimally, the optical grating elements can be optimized for the particulars of the lens train and vice-versa. For example, the optical grating elements can be arranged to emit into an output cone matching the acceptance aperture of the coupling lens. For example, optical grating elements may have an output center at 0° and ±25° with angle spread both ±11° (NA=0.2) and ±30° (NA=0.5). In simulations, such a design space seems to be achievable within realistic fabrication constraints at high calculated efficiency (within a factor of 2 of the theoretical ideal round-trip). That is in the along-waveguide direction, but the grating output light fan (center and spread) can also be adjusted in the orthogonal-to-waveguide direction by adjusting the waveguide width and manipulating the grating geometry. Preliminary simulations suggest that at least ±10° tilt of the beam in the orthogonal-to-waveguide direction can be achieved with minimal loss of efficiency, and likewise make round beams with a numerical aperture of 0.2 to 0.3 with high efficiency.

It also may be useful to move the focal point of the output light somewhat (perhaps 10-100 μm, depending on the grating element area) above or below the actual interface coupling surface to achieve a virtual curved image plane without actually curving the chip. Curved image planes can make the lens train simpler.

Figure 16:
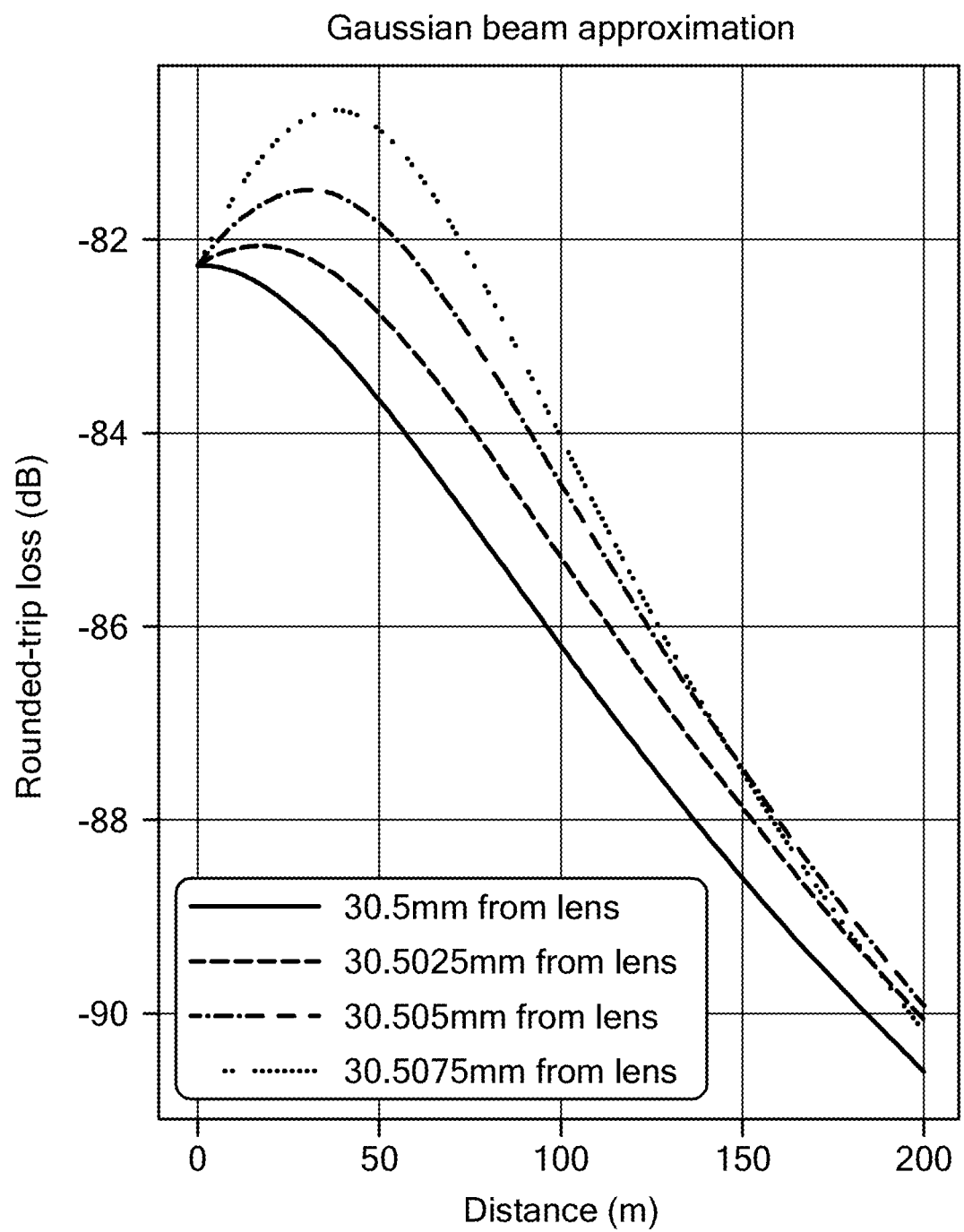
FIG. 16 is a set of graphs showing round-trip loss of a monostatic PIC-based LiDAR system vs. distance-to-target under different focal settings.

FIG. 16 shows how the focal setting (distance between the coupling surface of the PIC and the coupling lens) changes the signal collection efficiency as a function of distance, in an example LiDAR configuration. When signal collection is optimized for one range, that ensures a minimum spot size at that range in the scene. As a result, the spot size will be larger than the ideal spot size at other ranges (closer or further from the LiDAR system). A LiDAR system can be optimized for a different range by changing the distance between the PIC and objective. Alternatively, the grating design can be adjusted to change the effective focal plane above or below the PIC, as shown in FIG. 12, to optimize individual pixels for data collection from different ranges. Adjusting the grating focal plane adjusts the range at which the spot size is minimized in the scene (analogous to changing PIC-lens distance). This enables different gratings on the same PIC to be designed for optimal signal collection at different ranges. For example, long range and short range gratings could be alternated across the PIC. Or in another example, the gratings corresponding to regions in the field of view which tend to be closer to the LiDAR system (generally toward the bottom of the field of view) could be optimized for close range signal collection. Gratings corresponding to regions in the field of view with objects which tend to be far away from the LiDAR system (generally toward the top of the field of view) could be optimized for long range signal collection. Arranging different grating designs across the PIC can minimize the dwell time to collect range data from the scene.

Figure 17:
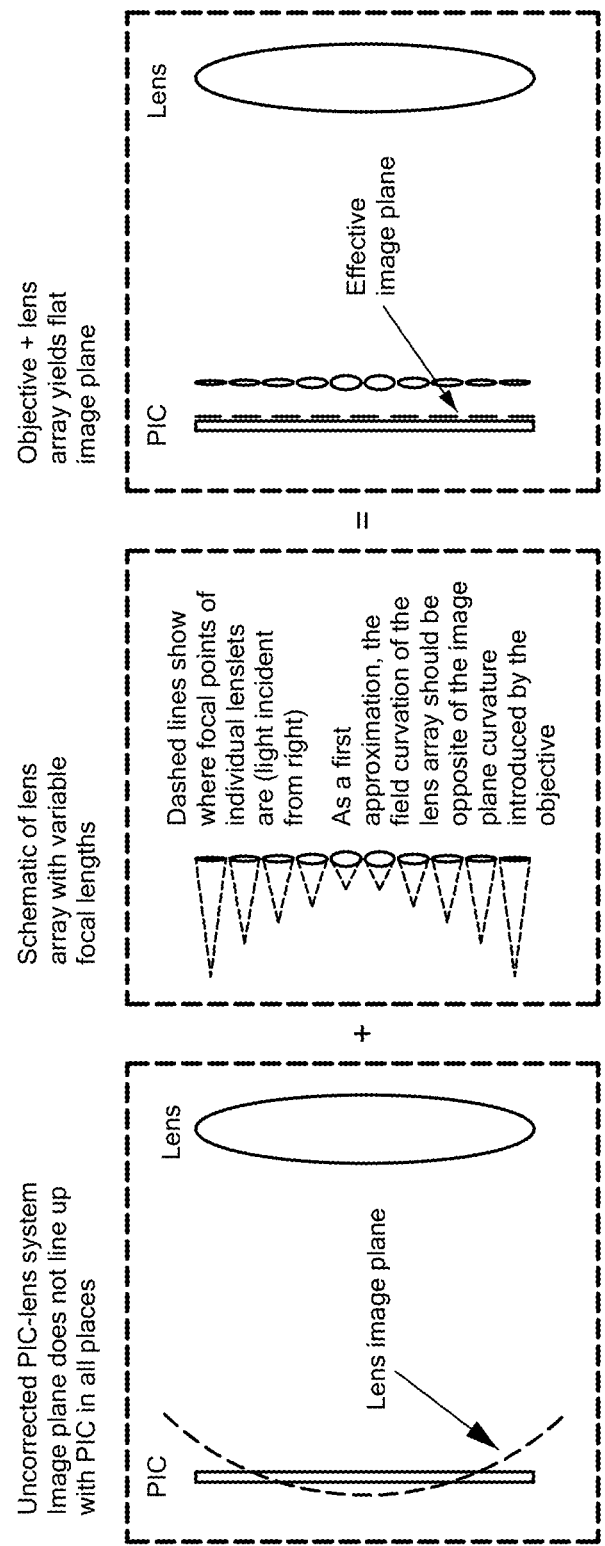
FIG. 17 shows how a lens array can be included between the PIC and the first lens element in the coupling lens.

In some cases, it may be preferred to use an optical element that is separate from the gratings to correct for aberrations. In some other cases, the gratings may not provide sufficient degrees of freedom to correct for all aberrations in the coupling lens system. In some applications, a lens array can be included between the PIC and the first lens element in the coupling lens, as shown in FIG. 17. The elements of this lens array can be designed to correct for aberrations introduced by the coupling lens. A lens array with varying lens element design distributed across the area of the array can be used to correct for aberrations that vary as a function of position on the PIC. For example, the intermediate lens array can be used to correct for focal plane curvature from the coupling lens. Gratings can be used to correct for focal plane curvature (as shown in FIG. 9), but this requires larger gratings for larger shifts in the focal plane and it may be desirable to correct for larger focal plane curvature than can practically be done using grating design alone. By varying the designed focal length of the lens array elements as a function of position on the lens array (and over the PIC), the lens array can flatten the effective focal plane on the PIC as shown in FIG. 17. The optical grating elements and the planar lens array may be organized to shift the focal plane of pixels at different points within the field of view and/or the optical grating elements may be organized into a plurality of grating subsets each optimized for a different range in the field of view.

In addition or alternatively, a holographic element can be inserted between the PIC and coupling lens as shown in FIG. 18 to introduce corrections to the phase front of the light emitted by the gratings. If the beam emitted from the grating is diverging, the holographic element can more easily introduce high frequency corrections to the phase front because the beam will be larger once it impinges on the holographic element—the minimum feature size required on the holographic element to correct the phase front will be bigger than what would be required on the grating. The holographic element can comprise, for example, a grating structure formed by a physical profile in a transmissive surface (phase grating formed by topography), refractive index variations within a transmissive surface (phase grating formed by refractive index variations), or a surface with varying transmissivity (amplitude grating). Holographic elements with high transmission (phase gratings) are preferable for a LiDAR application because LiDAR systems are often photon starved and any additional losses are undesirable.

It will be appreciated that similar arrangements can be implemented for delivering light inputs to a photonic integrated circuit (PIC) device where the interface coupling surface is an optical grating with multiple optical input locations each configured to receive a light input to the PIC. The coupling lens has a lens aperture through which pass light beams from an optical processing system for shaping of the light beams by the coupling lens for delivery to the PIC. The optical coupling array is located between the interface coupling surface of the PIC and the coupling lens and there are multiple individual light shaping elements that are configured for transmission and shaping of the light beams from the coupling lens for delivery of entire light beams to selected optical input locations of the PIC.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A coupling interface arrangement for a photonic integrated circuit (PIC), the arrangement comprising:
a PIC including an interface coupling surface having a plurality of optical grating elements arranged to form a plurality of optical output locations configured to produce corresponding light output beams; and
a coupling lens configured for coupling the light output beams into a conjugate plane at a far-field scene characterized by one or more optical aberrations that degrade optical resolution of the light outputs;
wherein the optical grating elements are configured to correct for the one or more optical aberrations.

2. The arrangement according to claim 1, wherein the optical grating elements are characterized by a grating tooth width, a grating period, and a grating thickness, at least one of which is configured to correct for the optical aberrations of the light output beams.

3. The arrangement according to claim 1, wherein the PIC includes a plurality of optical waveguides configured to deliver light to the optical output locations and characterized by a waveguide geometry configured to correct for the optical aberrations of the light output beams.

4. The arrangement according to claim 3, wherein the PIC is characterized by a grating-waveguide spacing configured to correct for the optical aberrations of the light output beams.

5. The arrangement according to claim 1, wherein the coupling lens is characterized by a curved focal plane, and wherein the plurality of optical grating elements are configured to control focus of the light output beams to correct for the curved focal plane.

6. The arrangement according to claim 1, wherein the plurality of optical grating elements are periodic grating elements.

7. The arrangement according to claim 1, wherein the plurality of optical grating elements are aperiodic grating elements.

8. The arrangement according to claim 1, wherein the PIC is configured as part of a monostatic optical system.

9. The arrangement according to claim 1, wherein the PIC is configured as part of a bistatic optical system.

10. The arrangement according to claim 1, wherein the coupling lens is a telecentric lens for coupling light output beams with chief ray optic axes perpendicular to the interface coupling surface.

11. The arrangement according to claim 1, wherein the coupling lens is a conventional lens for coupling light output beams with chief ray optic axes at various different angles relative to perpendicular to the interface coupling surface.

12. The arrangement according to claim 1, further comprising:
a planar lens array with a plurality of lens elements of differing focal lengths located between the interface coupling surface and the coupling lens configured to match the focal planes of the PIC and coupling lens.

13. The arrangement according to claim 12, wherein the PIC is characterized by a field-of-view, and wherein the optical grating elements and the planar lens array are organized to shift the focal plane of pixels at different points within the field of view.

14. The arrangement according to claim 1, further comprising:
a holographic element located between the interface coupling surface and the coupling lens configured to cooperate with the optical grating elements to adjust the phase and intensity profiles of the light output beams to correct for the one or more optical aberrations.

15. The arrangement according to claim 1, wherein the optical grating elements are configured to match a numerical aperture of the light output beams from the PIC with a numerical aperture of the coupling lens.

16. The arrangement according to claim 1, wherein the PIC is characterized by a field-of-view, and wherein the optical grating elements are organized into a plurality of grating subsets each optimized for a different range in the field of view.

17. A coupling interface arrangement for a photonic integrated circuit (PIC), the arrangement comprising:
a PIC including an interface coupling surface having a plurality of optical grating elements arranged to form a plurality of optical input locations configured to receive light input beams to the PIC; and
a coupling lens configured for delivering the light input beams to the optical input locations by optically shaping optical communications signals from a conjugate plane at a far-field scene characterized by one or more optical aberrations that degrade optical resolution of the light input beams;
wherein the optical grating elements are configured to correct for the one or more optical aberrations.

18. The arrangement according to claim 17, wherein the optical grating elements are characterized by a grating tooth width, a grating period, and a grating thickness, at least one of which is configured to correct for the optical aberrations of the light input beams.

19. The arrangement according to claim 17, wherein the PIC includes a plurality of optical waveguides configured to receive light at the optical input locations and characterized by a waveguide geometry configured to correct for the optical aberrations of the light input beams.

20. The arrangement according to claim 19, wherein the PIC is characterized by a grating-waveguide spacing configured to correct for the optical aberrations of the light input beams.

21. The arrangement according to claim 17, wherein the coupling lens is characterized by a curved focal plane, and wherein the plurality of optical grating elements are configured to control focus of the light input beams to correct for the curved focal plane.

22. The arrangement according to claim 17, wherein the plurality of optical grating elements are periodic grating elements.

23. The arrangement according to claim 17, wherein the plurality of optical grating elements are aperiodic grating elements.

24. The arrangement according to claim 17, wherein the PIC is configured as part of a monostatic optical system.

25. The arrangement according to claim 17, wherein the PIC is configured as part of a bistatic optical system.

26. The arrangement according to claim 17, wherein the coupling lens is a telecentric lens for coupling light input beams with chief ray optic axes perpendicular to the interface coupling surface.

27. The arrangement according to claim 17, wherein the coupling lens is a conventional lens for coupling light input beams with chief ray optic axes at various different angles relative to perpendicular to the interface coupling surface.

28. The arrangement according to claim 17, further comprising:
a planar lens array with a plurality of lens elements of differing focal lengths located between the interface coupling surface and the coupling lens configured to match the focal planes of the PIC and coupling lens.

29. The arrangement according to claim 28, wherein the PIC is characterized by a field-of-view, and wherein the optical grating elements and the planar lens array are organized to shift the focal plane of pixels at different points within the field of view.

30. The arrangement according to claim 17, further comprising:
a holographic element located between the interface coupling surface and the coupling lens configured to cooperate with the optical grating elements to adjust the phase and intensity profiles of the light output beams to correct for the one or more optical aberrations.

31. The arrangement according to claim 17, wherein the optical grating elements are configured to match a numerical aperture of the light input beams to the PIC with a numerical aperture of the coupling lens.

32. The arrangement according to claim 17, wherein the PIC is characterized by a field-of-view, and wherein the optical grating elements are organized into a plurality of grating subsets each optimized for a different range in the field of view.

* * * * *